US009293039B2

(12) United States Patent
Margulici et al.

(10) Patent No.: US 9,293,039 B2
(45) Date of Patent: *Mar. 22, 2016

(54) ESTIMATING TIME TRAVEL DISTRIBUTIONS ON SIGNALIZED ARTERIALS

(71) Applicant: Pelmorex Canada Inc., Oakville (CA)

(72) Inventors: J. D. Margulici, Oakland, CA (US); Kevin Adda, Santa Clara, CA (US); Andre Gueziec, Sunnyvale, CA (US); Edgar Rojas, Santa Clara, CA (US)

(73) Assignee: Pelmorex Canada Inc., Oakville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,352

(22) Filed: Jul. 3, 2014

(65) Prior Publication Data

US 2014/0316688 A1 Oct. 23, 2014

Related U.S. Application Data

(63) Continuation of application No. 13/752,351, filed on Jan. 28, 2013, now Pat. No. 8,781,718.

(60) Provisional application No. 61/591,758, filed on Jan. 27, 2012.

(51) Int. Cl.

| | |
|---|---|
| ***G06F 19/00*** | (2011.01) |
| ***G08G 1/01*** | (2006.01) |
| ***G08G 1/00*** | (2006.01) |

(52) U.S. Cl.

CPC ................ *G08G 1/0129* (2013.01); *G08G 1/00* (2013.01); *G08G 1/0112* (2013.01); *G08G 1/0116* (2013.01)

(58) Field of Classification Search

USPC .......................................... 701/119, 411, 414

See application file for complete search history.

(56) References Cited

U.S. PATENT DOCUMENTS

| | | | |
|---|---|---|---|
| 4,734,863 | A | 3/1988 | Honey et al. |
| 4,788,645 | A | 11/1988 | Zavoli et al. |
| 4,792,803 | A | 12/1988 | Madnick et al. |
| 4,796,191 | A | 1/1989 | Honey et al. |
| 4,878,170 | A | 10/1989 | Zeevi |

(Continued)

FOREIGN PATENT DOCUMENTS

| | | |
|---|---|---|
| CO | 6710924 | 7/2013 |
| DE | 19856704 | 6/2001 |

(Continued)

OTHER PUBLICATIONS

Acura Debuts AcuraLink™ Satellite-Linked Communication System with Industry's First Standard Real Time Traffic Feature at New York International Auto Show, 2004, 4 pages.

(Continued)

*Primary Examiner* — Hussein A. Elchanti

(74) *Attorney, Agent, or Firm* — Polsinelli LLP

(57) ABSTRACT

A system is provided for estimating time travel distributions on signalized arterials. The system may be implemented as a network service. Traffic data regarding a plurality of travel times on a signalized arterial may be received. A present distribution of the travel times on the signalized arterial may be determined. A prior distribution based on one or more travel time observations may also be determined. The present distribution may be calibrated based on the prior distribution.

18 Claims, 4 Drawing Sheets

(56) References Cited

U.S. PATENT DOCUMENTS

| | | | |
|---|---|---|---|
| 4,914,605 | A | 4/1990 | Loughmiller, Jr. et al. |
| 4,926,343 | A | 5/1990 | Tsuruta et al. |
| 5,068,656 | A | 11/1991 | Sutherland |
| 5,095,532 | A | 3/1992 | Mardus |
| 5,126,941 | A | 6/1992 | Gurmu et al. |
| 5,164,904 | A | 11/1992 | Sumner |
| 5,173,691 | A | 12/1992 | Sumner |
| 5,182,555 | A | 1/1993 | Sumner |
| 5,220,507 | A | 6/1993 | Kirson |
| 5,247,439 | A | 9/1993 | Gurmu et al. |
| 5,262,775 | A | 11/1993 | Tamai et al. |
| 5,276,785 | A | 1/1994 | Mackinlay et al. |
| 5,283,575 | A | 2/1994 | Kao et al. |
| 5,291,412 | A | 3/1994 | Tamai et al. |
| 5,291,413 | A | 3/1994 | Tamai et al. |
| 5,291,414 | A | 3/1994 | Tamai et al. |
| 5,297,028 | A | 3/1994 | Ishikawa |
| 5,297,049 | A | 3/1994 | Gurmu et al. |
| 5,303,159 | A | 4/1994 | Tamai et al. |
| 5,311,195 | A | 5/1994 | Mathis et al. |
| 5,311,434 | A | 5/1994 | Tamai |
| 5,339,246 | A | 8/1994 | Kao |
| 5,343,400 | A | 8/1994 | Ishikawa |
| 5,345,382 | A | 9/1994 | Kao |
| 5,359,529 | A | 10/1994 | Snider |
| 5,374,933 | A | 12/1994 | Kao |
| 5,377,113 | A | 12/1994 | Shibazaki et al. |
| 5,390,123 | A | 2/1995 | Ishikawa |
| 5,394,333 | A | 2/1995 | Kao |
| 5,402,120 | A | 3/1995 | Fujii et al. |
| 5,414,630 | A | 5/1995 | Oshizawa et al. |
| 5,428,545 | A | 6/1995 | Maegawa et al. |
| 5,430,655 | A | 7/1995 | Adachi |
| 5,440,484 | A | 8/1995 | Kao |
| 5,465,079 | A | 11/1995 | Bouchard et al. |
| 5,477,220 | A | 12/1995 | Ishikawa |
| 5,485,161 | A | 1/1996 | Vaughn |
| 5,488,559 | A | 1/1996 | Seymour |
| 5,499,182 | A | 3/1996 | Ousborne |
| 5,508,931 | A | 4/1996 | Snider |
| 5,515,283 | A | 5/1996 | Desai |
| 5,515,284 | A | 5/1996 | Abe |
| 5,539,645 | A | 7/1996 | Mandhyan et al. |
| 5,546,107 | A | 8/1996 | Deretsky et al. |
| 5,548,822 | A | 8/1996 | Yogo |
| 5,550,538 | A | 8/1996 | Fujii et al. |
| 5,554,845 | A | 9/1996 | Russell |
| 5,583,972 | A | 12/1996 | Miller |
| 5,608,635 | A | 3/1997 | Tamai |
| 5,610,821 | A | 3/1997 | Gazis et al. |
| 5,689,252 | A | 11/1997 | Ayanoglu et al. |
| 5,694,534 | A | 12/1997 | White, Jr. et al. |
| 5,699,056 | A | 12/1997 | Yoshida |
| 5,706,503 | A | 1/1998 | Poppen et al. |
| 5,712,788 | A | 1/1998 | Liaw et al. |
| 5,729,458 | A | 3/1998 | Poppen |
| 5,731,978 | A | 3/1998 | Tamai et al. |
| 5,742,922 | A | 4/1998 | Kim |
| 5,751,245 | A | 5/1998 | Janky et al. |
| 5,751,246 | A | 5/1998 | Hertel |
| 5,757,359 | A | 5/1998 | Morimoto et al. |
| 5,774,827 | A | 6/1998 | Smith et al. |
| 5,818,356 | A | 10/1998 | Schuessler |
| 5,822,712 | A | 10/1998 | Olsson |
| 5,845,227 | A | 12/1998 | Peterson |
| 5,850,190 | A | 12/1998 | Wicks et al. |
| 5,862,244 | A | 1/1999 | Kleiner et al. |
| 5,862,509 | A | 1/1999 | Desai et al. |
| 5,864,305 | A | 1/1999 | Rosenquist |
| 5,867,110 | A | 2/1999 | Naito et al. |
| 5,893,081 | A | 4/1999 | Poppen |
| 5,893,898 | A | 4/1999 | Tanimoto |
| 5,898,390 | A | 4/1999 | Oshizawa et al. |
| 5,902,350 | A | 5/1999 | Tamai et al. |
| 5,904,728 | A | 5/1999 | Tamai et al. |
| 5,908,464 | A | 6/1999 | Kishigami et al. |
| 5,910,177 | A | 6/1999 | Zuber |
| 5,911,773 | A | 6/1999 | Mutsuga et al. |
| 5,912,635 | A | 6/1999 | Oshizawa et al. |
| 5,916,299 | A | 6/1999 | Poppen |
| 5,922,042 | A | 7/1999 | Sekine et al. |
| 5,928,307 | A | 7/1999 | Oshizawa et al. |
| 5,931,888 | A | 8/1999 | Hiyokawa |
| 5,933,100 | A | 8/1999 | Golding |
| 5,938,720 | A | 8/1999 | Tamai |
| 5,948,043 | A | 9/1999 | Mathis et al. |
| 5,978,730 | A | 11/1999 | Poppen et al. |
| 5,982,298 | A | 11/1999 | Lappenbusch et al. |
| 5,987,381 | A | 11/1999 | Oshizawa et al. |
| 5,991,687 | A | 11/1999 | Hale et al. |
| 5,999,882 | A | 12/1999 | Simpson et al. |
| 6,009,374 | A | 12/1999 | Urahashi |
| 6,011,494 | A | 1/2000 | Watanabe et al. |
| 6,016,485 | A | 1/2000 | Amakawa et al. |
| 6,021,406 | A | 2/2000 | Kuznetsov |
| 6,038,509 | A | 3/2000 | Poppen et al. |
| 6,058,390 | A | 5/2000 | Liaw et al. |
| 6,064,970 | A | 5/2000 | McMillan et al. |
| 6,091,359 | A | 7/2000 | Geier |
| 6,091,956 | A | 7/2000 | Hollenberg |
| 6,097,399 | A | 8/2000 | Bhatt et al. |
| 6,111,521 | A | 8/2000 | Mulder et al. |
| 6,144,919 | A | 11/2000 | Ceylan et al. |
| 6,147,626 | A | 11/2000 | Sakakibara |
| 6,150,961 | A | 11/2000 | Alewine et al. |
| 6,161,092 | A | 12/2000 | Latshaw et al. |
| 6,169,552 | B1 | 1/2001 | Endo et al. |
| 6,188,956 | B1 | 2/2001 | Walters |
| 6,209,026 | B1 | 3/2001 | Ran et al. |
| 6,222,485 | B1 | 4/2001 | Walters et al. |
| 6,226,591 | B1 | 5/2001 | Okumura et al. |
| 6,236,933 | B1 | 5/2001 | Lang |
| 6,253,146 | B1 | 6/2001 | Hanson et al. |
| 6,253,154 | B1 | 6/2001 | Oshizawa et al. |
| 6,256,577 | B1 | 7/2001 | Graunke |
| 6,259,987 | B1 | 7/2001 | Ceylan et al. |
| 6,282,486 | B1 | 8/2001 | Bates et al. |
| 6,282,496 | B1 | 8/2001 | Chowdhary |
| 6,292,745 | B1 | 9/2001 | Robare et al. |
| 6,295,492 | B1 | 9/2001 | Lang et al. |
| 6,297,748 | B1 | 10/2001 | Lappenbusch et al. |
| 6,298,305 | B1 | 10/2001 | Kadaba et al. |
| 6,317,685 | B1 | 11/2001 | Kozak et al. |
| 6,317,686 | B1 | 11/2001 | Ran |
| 6,335,765 | B1 | 1/2002 | Daly et al. |
| 6,353,795 | B1 | 3/2002 | Ranjan |
| 6,356,836 | B1 | 3/2002 | Adolph |
| 6,360,165 | B1 | 3/2002 | Chowdhary |
| 6,362,778 | B2 | 3/2002 | Neher |
| 6,415,291 | B2 | 7/2002 | Bouve et al. |
| 6,424,910 | B1 | 7/2002 | Ohler et al. |
| 6,442,615 | B1 | 8/2002 | Nordenstam et al. |
| 6,456,931 | B1 | 9/2002 | Polidi et al. |
| 6,456,935 | B1 | 9/2002 | Ng |
| 6,463,400 | B1 | 10/2002 | Barkley-Yeung |
| 6,466,862 | B1 | 10/2002 | DeKock et al. |
| 6,470,268 | B1 | 10/2002 | Ashcraft et al. |
| 6,473,000 | B1 | 10/2002 | Secreet et al. |
| 6,480,783 | B1 | 11/2002 | Myr |
| 6,504,541 | B1 | 1/2003 | Liu et al. |
| 6,529,143 | B2 | 3/2003 | Mikkola et al. |
| 6,532,304 | B1 | 3/2003 | Liu et al. |
| 6,539,302 | B1 | 3/2003 | Bender et al. |
| 6,542,814 | B2 | 4/2003 | Polidi et al. |
| 6,552,656 | B2 | 4/2003 | Polidi et al. |
| 6,556,905 | B1 | 4/2003 | Mittelsteadt et al. |
| 6,559,865 | B1 | 5/2003 | Angwin |
| 6,574,548 | B2 | 6/2003 | DeKock et al. |
| 6,584,400 | B2 | 6/2003 | Beardsworth |
| 6,594,576 | B2 | 7/2003 | Fan et al. |
| 6,598,016 | B1 | 7/2003 | Zavoli et al. |
| 6,600,994 | B1 | 7/2003 | Polidi |
| 6,603,405 | B2 | 8/2003 | Smith |
| 6,622,086 | B2 | 9/2003 | Polidi |

(56) References Cited

U.S. PATENT DOCUMENTS

| | | | |
|---|---|---|---|
| 6,639,550 | B2 | 10/2003 | Knockheart et al. |
| 6,643,581 | B2 | 11/2003 | Ooishi |
| 6,650,997 | B2 | 11/2003 | Funk |
| 6,654,681 | B1 | 11/2003 | Kiendl et al. |
| 6,675,085 | B2 | 1/2004 | Straub |
| 6,681,176 | B2 | 1/2004 | Funk et al. |
| 6,687,615 | B1 | 2/2004 | Krull et al. |
| 6,700,503 | B2 | 3/2004 | Masar et al. |
| 6,710,774 | B1 | 3/2004 | Kawasaki et al. |
| 6,720,889 | B2 | 4/2004 | Yamaki et al. |
| 6,728,605 | B2 | 4/2004 | Lash et al. |
| 6,728,628 | B2 | 4/2004 | Peterson |
| 6,731,940 | B1 | 5/2004 | Nagendran |
| 6,735,516 | B1 | 5/2004 | Manson |
| 6,754,833 | B1 | 6/2004 | Black et al. |
| 6,785,606 | B2 | 8/2004 | DeKock et al. |
| 6,791,472 | B1 | 9/2004 | Hoffberg |
| 6,807,483 | B1 | 10/2004 | Chao et al. |
| 6,845,316 | B2 | 1/2005 | Yates |
| 6,859,728 | B2 | 2/2005 | Sakamoto et al. |
| 6,862,524 | B1 | 3/2005 | Nagda et al. |
| RE38,724 | E | 4/2005 | Peterson |
| 6,885,937 | B1 | 4/2005 | Sunranyi |
| 6,901,330 | B1 | 5/2005 | Krull et al. |
| 6,914,541 | B1 | 7/2005 | Zierden |
| 6,922,629 | B2 | 7/2005 | Yoshikawa et al. |
| 6,931,309 | B2 | 8/2005 | Phelan et al. |
| 6,952,643 | B2 | 10/2005 | Matsuoka et al. |
| 6,965,665 | B2 | 11/2005 | Fan et al. |
| 6,983,204 | B2 | 1/2006 | Knutson |
| 6,987,964 | B2 | 1/2006 | Obradovich et al. |
| 6,989,765 | B2 | 1/2006 | Gueziec |
| 6,999,873 | B1 | 2/2006 | Krull et al. |
| 7,010,583 | B1 | 3/2006 | Aizono et al. |
| 7,062,378 | B2 | 6/2006 | Krull et al. |
| 7,069,143 | B2 | 6/2006 | Peterson |
| 7,103,854 | B2 | 9/2006 | Fuchs et al. |
| 7,161,497 | B2 | 1/2007 | Gueziec |
| 7,209,828 | B2 | 4/2007 | Katou |
| 7,221,287 | B2 | 5/2007 | Gueziec |
| 7,243,134 | B2 | 7/2007 | Bruner et al. |
| 7,343,242 | B2 | 3/2008 | Breitenberger et al. |
| 7,356,392 | B2 | 4/2008 | Hubbard et al. |
| 7,375,649 | B2 | 5/2008 | Gueziec |
| 7,424,388 | B2 | 9/2008 | Sato |
| 7,433,676 | B2 | 10/2008 | Kobayashi et al. |
| 7,440,842 | B1 | 10/2008 | Vorona |
| 7,486,201 | B2 | 2/2009 | Kelly et al. |
| 7,508,321 | B2 | 3/2009 | Gueziec |
| 7,557,730 | B2 | 7/2009 | Gueziec |
| 7,558,674 | B1 | 7/2009 | Neiley et al. |
| 7,603,138 | B2 | 10/2009 | Zhang et al. |
| 7,610,145 | B2 | 10/2009 | Kantarjiev et al. |
| 7,613,564 | B2 | 11/2009 | Vorona |
| 7,634,352 | B2 | 12/2009 | Soulchin et al. |
| 7,702,452 | B2 | 4/2010 | Kantarjiev et al. |
| 7,792,642 | B1 | 9/2010 | Neiley et al. |
| 7,880,642 | B2 | 2/2011 | Gueziec |
| 7,908,076 | B2 | 3/2011 | Downs et al. |
| 7,912,627 | B2 | 3/2011 | Downs et al. |
| 8,024,111 | B1 | 9/2011 | Meadows et al. |
| 8,103,443 | B2 | 1/2012 | Kantarjiev et al. |
| 8,229,658 | B1 | 7/2012 | Dabell |
| 8,358,222 | B2 | 1/2013 | Gueziec |
| 8,428,856 | B2 | 4/2013 | Tischer |
| 8,531,312 | B2 | 9/2013 | Gueziec |
| 8,537,033 | B2 | 9/2013 | Gueziec |
| 8,564,455 | B2 | 10/2013 | Gueziec |
| 8,619,072 | B2 | 12/2013 | Gueziec |
| 8,660,780 | B2 | 2/2014 | Kantarjiev |
| 8,718,910 | B2 | 5/2014 | Gueziec |
| 8,725,396 | B2 | 5/2014 | Gueziec |
| 8,781,718 | B2 * | 7/2014 | Margulici et al. ............. 701/119 |
| 8,786,464 | B2 | 7/2014 | Gueziec |
| 8,825,356 | B2 | 9/2014 | Vorona |
| 8,958,988 | B2 | 2/2015 | Gueziec |
| 8,965,695 | B2 | 2/2015 | Tzamaloukas |
| 8,972,171 | B1 | 3/2015 | Barth |
| 8,982,116 | B2 | 3/2015 | Gueziec |
| 9,002,636 | B2 | 4/2015 | Udeshi et al. |
| 9,046,924 | B2 | 6/2015 | Gueziec |
| 9,070,291 | B2 | 6/2015 | Gueziec |
| 9,082,303 | B2 | 7/2015 | Gueziec |
| 9,127,959 | B2 | 9/2015 | Gueziec |
| 9,158,980 | B1 | 10/2015 | Ferguson et al. |
| 2001/0014848 | A1 | 8/2001 | Walgers et al. |
| 2001/0018628 | A1 | 8/2001 | Jenkins et al. |
| 2001/0026276 | A1 | 10/2001 | Sakamoto et al. |
| 2001/0033225 | A1 | 10/2001 | Razavi et al. |
| 2001/0047242 | A1 | 11/2001 | Ohta |
| 2002/0022923 | A1 | 2/2002 | Hirabayashi et al. |
| 2002/0042819 | A1 | 4/2002 | Reichert et al. |
| 2002/0077748 | A1 | 6/2002 | Nakano |
| 2002/0152020 | A1 | 10/2002 | Seibel |
| 2002/0177947 | A1 | 11/2002 | Cayford |
| 2003/0009277 | A1 | 1/2003 | Fan et al. |
| 2003/0046158 | A1 | 3/2003 | Kratky |
| 2003/0055558 | A1 | 3/2003 | Watanabe et al. |
| 2003/0109985 | A1 | 6/2003 | Kotzin |
| 2003/0135304 | A1 | 7/2003 | Sroub et al. |
| 2003/0151592 | A1 | 8/2003 | Ritter |
| 2003/0182052 | A1 | 9/2003 | DeLorme et al. |
| 2004/0034464 | A1 | 2/2004 | Yoshikawa et al. |
| 2004/0046759 | A1 | 3/2004 | Soulchin et al. |
| 2004/0049424 | A1 | 3/2004 | Murray et al. |
| 2004/0080624 | A1 | 4/2004 | Yuen |
| 2004/0107288 | A1 | 6/2004 | Menninger et al. |
| 2004/0143385 | A1 | 7/2004 | Smyth et al. |
| 2004/0166939 | A1 | 8/2004 | Leifer et al. |
| 2004/0225437 | A1 | 11/2004 | Endo et al. |
| 2004/0249568 | A1 | 12/2004 | Endo et al. |
| 2005/0021225 | A1 | 1/2005 | Kantarjiev et al. |
| 2005/0027436 | A1 | 2/2005 | Yoshikawa et al. |
| 2005/0143902 | A1 | 6/2005 | Soulchin et al. |
| 2005/0154505 | A1 | 7/2005 | Nakamura et al. |
| 2005/0212756 | A1 | 9/2005 | Marvit et al. |
| 2005/0240340 | A1 | 10/2005 | Ishikawa et al. |
| 2006/0122846 | A1 | 6/2006 | Burr et al. |
| 2006/0143959 | A1 | 7/2006 | Stehle et al. |
| 2006/0145892 | A1 | 7/2006 | Gueziec |
| 2006/0158330 | A1 | 7/2006 | Gueziec |
| 2006/0238521 | A1 | 10/2006 | Westerman et al. |
| 2006/0238617 | A1 | 10/2006 | Tamir |
| 2006/0284766 | A1 | 12/2006 | Gruchala et al. |
| 2007/0013551 | A1 | 1/2007 | Gueziec |
| 2007/0038362 | A1 | 2/2007 | Gueziec |
| 2007/0060384 | A1 | 3/2007 | Dohta |
| 2007/0066394 | A1 | 3/2007 | Ikeda et al. |
| 2007/0115252 | A1 | 5/2007 | Burgmans |
| 2007/0197217 | A1 | 8/2007 | Sutardja |
| 2007/0208495 | A1 | 9/2007 | Chapman et al. |
| 2007/0208496 | A1 | 9/2007 | Downs et al. |
| 2007/0211026 | A1 | 9/2007 | Ohta |
| 2007/0211027 | A1 | 9/2007 | Ohta |
| 2007/0222750 | A1 | 9/2007 | Ohta |
| 2007/0247291 | A1 | 10/2007 | Masuda et al. |
| 2007/0265766 | A1 | 11/2007 | Jung et al. |
| 2008/0021632 | A1 | 1/2008 | Amano |
| 2008/0071465 | A1 | 3/2008 | Chapman et al. |
| 2008/0084385 | A1 | 4/2008 | Ranta et al. |
| 2008/0096654 | A1 | 4/2008 | Mondesir et al. |
| 2008/0133120 | A1 | 6/2008 | Romanick |
| 2008/0248848 | A1 | 10/2008 | Rippy et al. |
| 2008/0255754 | A1 | 10/2008 | Pinto |
| 2008/0287189 | A1 | 11/2008 | Rabin |
| 2008/0297488 | A1 | 12/2008 | Operowsky et al. |
| 2009/0005965 | A1 | 1/2009 | Forstall et al. |
| 2009/0061971 | A1 | 3/2009 | Weitzner et al. |
| 2009/0066495 | A1 | 3/2009 | Newhouse et al. |
| 2009/0082950 | A1 | 3/2009 | Vorona |
| 2009/0096753 | A1 | 4/2009 | Lim |
| 2009/0112465 | A1 | 4/2009 | Weiss et al. |
| 2009/0118017 | A1 | 5/2009 | Perlman et al. |
| 2009/0118996 | A1 | 5/2009 | Kantarjiev et al. |

(56) References Cited

U.S. PATENT DOCUMENTS

| | | | |
|---|---|---|---|
| 2009/0189979 | A1 | 7/2009 | Smyth |
| 2009/0192702 | A1 | 7/2009 | Bourne |
| 2009/0254272 | A1 | 10/2009 | Hendrey |
| 2010/0079306 | A1 | 4/2010 | Liu et al. |
| 2010/0094531 | A1 | 4/2010 | MacLeod |
| 2010/0100307 | A1 | 4/2010 | Kim |
| 2010/0145569 | A1 | 6/2010 | Bourque et al. |
| 2010/0145608 | A1 | 6/2010 | Kurtti et al. |
| 2010/0175006 | A1 | 7/2010 | Li |
| 2010/0194632 | A1 | 8/2010 | Raento et al. |
| 2010/0198453 | A1 | 8/2010 | Dorogusker et al. |
| 2010/0225643 | A1 | 9/2010 | Gueziec |
| 2010/0305839 | A1 | 12/2010 | Wenzel |
| 2010/0312462 | A1 | 12/2010 | Gueziec |
| 2010/0333045 | A1 | 12/2010 | Gueziec |
| 2011/0037619 | A1 | 2/2011 | Ginsberg et al. |
| 2011/0106427 | A1 | 5/2011 | Kim et al. |
| 2011/0304447 | A1 | 12/2011 | Marumoto |
| 2012/0044066 | A1 | 2/2012 | Mauderer et al. |
| 2012/0065871 | A1 | 3/2012 | Deshpande et al. |
| 2012/0072096 | A1 | 3/2012 | Chapman et al. |
| 2012/0123667 | A1 | 5/2012 | Gueziec |
| 2012/0150422 | A1 | 6/2012 | Kantarjiev et al. |
| 2012/0150425 | A1 | 6/2012 | Chapman et al. |
| 2012/0158275 | A1 | 6/2012 | Huang et al. |
| 2012/0226434 | A1 | 9/2012 | Chiu |
| 2012/0290202 | A1 | 11/2012 | Gueziec |
| 2012/0290204 | A1 | 11/2012 | Gueziec |
| 2012/0296559 | A1 | 11/2012 | Gueziec |
| 2013/0033385 | A1 | 2/2013 | Gueziec |
| 2013/0204514 | A1 | 8/2013 | Margulici |
| 2013/0207817 | A1 | 8/2013 | Gueziec |
| 2013/0211701 | A1 | 8/2013 | Baker et al. |
| 2013/0297175 | A1 | 11/2013 | Davidson |
| 2013/0304347 | A1 | 11/2013 | Davidson |
| 2013/0304349 | A1 | 11/2013 | Davidson |
| 2014/0088871 | A1 | 3/2014 | Gueziec |
| 2014/0091950 | A1 | 4/2014 | Gueziec |
| 2014/0107923 | A1 | 4/2014 | Gueziec |
| 2014/0129124 | A1 | 5/2014 | Margulici |
| 2014/0129142 | A1 | 5/2014 | Kantarjiev |
| 2014/0139520 | A1 | 5/2014 | Gueziec |
| 2014/0200807 | A1 | 7/2014 | Geisberger |
| 2014/0236464 | A1 | 8/2014 | Gueziec |
| 2014/0249734 | A1 | 9/2014 | Gueziec |
| 2014/0320315 | A1 | 10/2014 | Gueziec |
| 2015/0177018 | A1 | 6/2015 | Gueziec |
| 2015/0248795 | A1 | 9/2015 | Davidson |
| 2015/0261308 | A1 | 9/2015 | Gueziec |
| 2015/0268055 | A1 | 9/2015 | Gueziec |
| 2015/0268056 | A1 | 9/2015 | Gueziec |
| 2015/0325123 | A1 | 11/2015 | Gueziec |

FOREIGN PATENT DOCUMENTS

| | | |
|---|---|---|
| EP | 0 749 103 | 12/1996 |
| EP | 0 987 665 | 3/2000 |
| EP | 1 006 367 | 6/2000 |
| EP | 2 178 061 | 4/2010 |
| EP | 2 635 989 | 9/2011 |
| EP | 2 616 910 | 7/2013 |
| EP | 2 638 493 | 9/2013 |
| EP | 2 710 571 | 3/2014 |
| EP | 2 820 631 | 1/2015 |
| GB | 2 400 293 | 10/2004 |
| JP | 05-313578 | 11/1993 |
| JP | 08-77485 | 3/1996 |
| JP | 10-261188 | 9/1998 |
| JP | 10-281782 | 10/1998 |
| JP | 10-293533 | 11/1998 |
| JP | 2000-055675 | 2/2000 |
| JP | 2000-113387 | 4/2000 |
| JP | 2001-330451 | 11/2001 |
| WO | WO 96/36929 | 11/1996 |
| WO | WO 98/23018 | 5/1998 |
| WO | WO 00/50917 | 8/2000 |
| WO | WO 01/88480 | 11/2001 |
| WO | WO 02/077921 | 10/2002 |
| WO | WO 03/014671 | 2/2003 |
| WO | WO 2005/013063 | 2/2005 |
| WO | WO 2005/076031 | 8/2005 |
| WO | WO 2010/073053 | 7/2010 |
| WO | WO 2012/024694 | 2/2012 |
| WO | WO 2012/037287 | 3/2012 |
| WO | WO 2012/065188 | 5/2012 |
| WO | WO 2012/159083 | 11/2012 |
| WO | WO 2013/113029 | 8/2013 |

OTHER PUBLICATIONS

Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.

Answer, Affirmative Defenses, and Counterclaims by Defendant Westwood One, Inc., to Plaintiff Triangle Software, LLC's Complaint for Patent Infringement, Mar. 11, 2011.

Answer and Counterclaims of TomTom, Inc. to Plaintiff Triangle Software, LLC's Complaint for Patent Infringement, May 16, 2011.

Amended Answer and Counterclaims of TomTom, Inc. to Plaintiff Triangle Software, LLC's Complaint for Patent Infringement, Mar. 16, 2011.

Attachment A of Garmin's Preliminary Invalidity Contentions and Certificate of Service filed May 16, 2011 in *Triangle Software, LLC. V. Garmin International, Inc. et al.*, Case No. 1: 10cv-1457-CMH-TCB in the United States District Court for the Eastern District of Virginia, Alexandria Division, 6 pages.

Attachment B of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 618 pages.

Audi-V150 Manual, Oct. 2001, 152 pages, Japan.

Balke, K.N., "Advanced Technologies for Communicating with Motorists: A Synthesis of Human Factors and Traffic Management Issues," Report No. FHWA/TX-92/1232-8, May 1992, Texas Department Transportation, Austin, TX, USA, 62 pages.

Barnaby J. Feder, "Talking Deals; Big Partners in Technology," Technology, The New York Times, Sep. 3, 1987.

Birdview Navigation System by Nissan Motor Corp, 240 Landmarks of Japanese Automotive Technology, 1995, 2 pages, Society of Automotive Engineers of Japan, Inc., Japan.

Blumentritt, K. et al., "Travel System Architecture Evaluation," Publication No. FHWA-RD-96-141, Jul. 1995, 504 pages, U.S. Department of Transportation, McLean, VA, USA.

Brooks, et al., "Turn-by-Turn Displays versus Electronic Maps: An On-the-Road Comparison of Driver Glance Behavior," Technical Report, The University of Michigan, Transportation Research Institute (UMTRI), Jan. 1999.

Burgett, A.L., "Safety Evaluation of TravTek," Vehicle Navigation & Information Systems Conference Proceedings (VNIS'91), p. 253, Part 1, Oct. 1991, pp. 819-825, Soc. Of Automotive Engineers, Inc., Warrendale, PA, USA.

Campbell, J.L. "Development of Human Factors Design Guidelines for Advanced Traveler Information Systems (ATIS)", Proceedings Vehicle Navigation and Information Systems Conference, 1995, pp, 161-164, IEEE, New York, NY, USA.

Campbell, J.L. "Development of Human Factors Design Guidelines for Advanced Traveler Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.

Carin Navigation System Manual and Service Manual for Model Carin 22SY520, 75 pages, Philips Car Systems, The Netherlands, [date unknown].

(56) References Cited

OTHER PUBLICATIONS

Cathey, F.W. et al., "A Prescription for Transit Arrival/Department Prediction Using Automatic Vehicle Location Data," Transportation Research Part C 11, 2003, pp. 241-264, Pergamon Press Ltd., Elsevier Ltd., U.K.
Chien, S.I. et al., "Predicting Travel Times for the South Jersey Real-Time Motorist Information System," Transportation Research Record 1855, Paper No. 03-2750, Revised Oct. 2001, pp. 32-40.
Chira-Chavala, T. et al., "Feasibility Study of Advanced Technology HOV Systems," vol. 3: Benefit Implications of Alternative Policies for Including HOV lanes in Route Guidance Networks, Dec. 1992, 84 ages, UCB-ITS-PRR-92-5 PATH Research Report, Inst. of Transportation Studies, Univ. of Calif., Berkeley, USA.
Clark, E.L., Development of Human Factors Guidelines for Advanced Traveler Information Systems (ATIS) and Commercial Vehicle Operations (CVO): Comparable Systems Analysis, Dec. 1996, 199 pages.
Dancer, F. et al., "Vehicle Navigation Systems: Is America Ready?," Navigation and Intelligent Transportation System, Automotive Electronics Series, Society of Automotive Engineers, 1998, pp. Cover pages, Table of Contents pp. 3-8.
Davies, P. et al., "Assessment of Advanced Technologies for Relieving Urban Traffic Congestion" National Cooperative Highway Research Program Report 340, Dec. 1991, 106 pages.
de Cambray, B. "Three-Dimensional (3D) Modeling in a Geographical Database," Auto-Carto'11, Eleventh International Conference on Computer Assisted Cartography, Oct. 30, 1993-Nov. 1, 1993, pp. 338-347, Minneapolis, USA.
Declaration Under 37 C.F.R. 1.131 and Source Code from U.S. Appl. No. 10/897,550, Oct. 27, 2008.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information System Conference Proceedings (VNIS'91), p. 253, Part 2, Oct. 1991, pp. 749-755, Soc. Of Automotive Engineers, Inc., Warrendale, PA, USA.
Endo, et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.
Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.
Expert Report of Dr. Michael Goodchild Concerning the Validity of U.S. Pat. No. 5,938,720 dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 16 pages.
Fawcett, J., "Adaptive Routing for Road Traffic," IEEE Computer Graphics and Applications, May/Jun. 2000, pp. 46-53, IEEE, New York, NY, USA.
Fleischman, R.N., "Research and Evaluation Plans for the TravTek IVHS Operational Field Test," Vehicle Navigation & Information Systems Conference Proceedings (VNIS'91), p. 253, Part 2, Oct. 1991, pp. 827-837, Soc. Of Automotive Engineers, Inc., Warrendale, PA, USA.
Garmin International, Inc.'s Answer and Counterclaims to Triangle Software, LLC's Complaint, Feb. 24, 2011.
Garmin International, Inc.'s Amended Answer and Counterclaims to Triangle Software, LLC's Complaint, Mar. 16, 2011.
Garmin International, Inc. and Garmin USA, Inc.'s Answer and Counterclaim to Triangle Software, LLC's Supplemental Complaints filed Jun. 17, 2011 in *Triangle Software, LLC* v. *Garmin International Inc. et al.*, in the United States District Court for the Eastern District of Virginia, Alexandria Division, Case No. 1:10-cv-1457-CMH-TCB, 36 pages.
Garmin's Preliminary Invalidity Contentions and Certificate of Service filed May 16, 2011 in *Triangle Software, LLC.* V. *Garmin International, Inc. et al.*, Case No. 1: 10-cv-1457-CMH-TCB in the United States District Court for the Eastern District of Virginia, Alexandria Division, 46 pages.
Goldberg et al., "Computing the Shortest Path: A Search Meets Graph Theory," Proc. of the 16th Annual ACM-SIAM Sym. on Discrete Algorithms, Jan. 23-25, 2005. Vancouver, BC.
Goldberg et al., "Computing the Shortest Path: A Search Meets Graph Theory," Microsoft Research, Technical Report MSR-TR-2004 Mar. 24, 2003.
Golisch, F., Navigation and Telematics in Japan, International Symposium On Car Navigation Systems, May 21, 1997, 20 pages, held in Barcelona, Spain.
GM Exhibits Prototype of TravTek Test Vehicle, Inside IVHS, Oct. 28, 1991, V. 1, No. 21, 2 pages.
Gueziec, Andre, "3D Traffic Visualization in Real Time," ACM Siggraph Technical Sketches, Conference Abstracts and Applications, p. 144, Los Angeles, CA, Aug. 2001.
Gueziec, A., "Architecture of a System for Producing Animated Traffic Reports," Mar. 30, 2011, 42 pages.
Handley, S. et al., "Learning to Predict the Duration of an Automobile Trip," Proceedings of the Fourth International Conference on Knowledge Discovery and Data Mining, 1998, 5 pages, AAAI Press, New York, NY, USA.
Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.
Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.
Hoffmann, G. et al., Travel Times as a Basic Part of the LISB Guidance Strategy, Third International Conference on Road Traffic Control, May 1-3, 1990, pp. 6-10, London, U.K.
Hoffmann, T., "2005 Acura RL Prototype Preview," Auto123.com, 4 pages.
Hu, Z. et al., "Real-time Data Fusion on Tracking Camera Pose for Direct Visual Guidance," IEEE Vehicles Symposium, Jun. 14-17, 2004, pp. 842-847, held in Parma, Italy.
Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.
Initial Expert Report of Roy Summer dated Jun. 16, 2011 in *Triangle Software, LLC* v. *Garmin International Inc. et al.*, in the United States District Court for the Eastern District of Virginia, Alexandria Division, Case No. 1:10-cv-1457-CMH-TCB, 289 pages.
Initial Expert Report of William R. Michalson, PH.D. dated Jun. 17, 2011 in *Triangle Software, LLC* v. *Garmin International Inc. et al.*, in the United States District Court for the Eastern District of Virginia, Alexandria Division, Case No. 1:10-cv-1457-CMH-TCB, 198 pages.
Inman, V.W., et al., "TravTek Global Evaluation and Executive Summary," Publication No. FHWA-RD-96-031, Mar. 1996, 104 pages, U.S. Department of Transportation, McLean, VA, USA.
Inman, V.W., et al., "TravTek Evaluation Rental and Local User Study," Publication No. FHWA-RD-96-028, Mar. 1996, 110 pages, U.S. Department of Transportation, McLean, VA, USA.
Jiang, G., "Travel-Time Prediction for Urban Arterial Road: A Case on China," Proceedings Intelligent Transportation Systems, Oct. 12-15, 2003, pp. 255-260, IEEE, New York, NY, USA.
Karabassi, A. et al., "Vehicle Route Prediction and Time and Arrival Estimation Techniques for Improved Transportation System Management," in Proceedings of the Intelligent Vehicles Symposium, 2003, pp. 511-516, IEEE, New York, NY, USA.
Koller, D. et al., "Virtual GIS: A Real-Time 3D Geographic Information System," Proceedings of the 6th IEEE Visualization Conference (VISUALIZATION 95) 1995, pp. 94-100, IEEE, New York, NY, USA.

(56) References Cited

OTHER PUBLICATIONS

Kopitz et al., Table of Contents, Chapter 6, Traffic Information Services, and Chapter 7, Intelligent Transport Systems and RDS-TMC in RDS: The Radio Data System, 1992, Cover p. XV, pp. 107-167, Back Cover page, Artech House Publishers, Boston, USA and London, Great Britain.
Krage, M.K., "The TravTek Driver Information System," Vehicle Navigation & Information Systems Conference Proceedings (VNIS'91), p. 253, Part 1, Oct. 1991, pp. 739-748, Soc. Of Automotive Engineers, Inc., Warrendale, PA, USA.
Ladner, R. et al., "3D Mapping of Interactive Synthetic Environment," Computing Practices, Mar. 2000, pp. 33-39, IEEE, New York, NY, USA.
Levinson, D., "Assessing the Benefits and Costs of Intelligent Transportation Systems: The Value of Advanced Traveler Information System," Publication UCB-ITS-PRR-99-20, California Path Program, Jul. 1999, Institute of Transportation Studies, University of California, Berkeley, CA, USA.
Lowenau, J., "Final Map Actualisation Requirements," Version 1.1, ActMAP Consortium, Sep. 30, 2004, 111 pages.
Meridian Series of GPS Receivers User Manual, Magellan, 2002, 106 pages, Thales Navigation, Inc., San Dimas, CA, USA.
Ness, M., "A Prototype Low Cost In-Vehicle Navigation System," IEEE-IEE Vehicle Navigation & Information Systems Conference (VNIS), 1993, pp. 56-59, New York, NY, USA.
Nintendo Wii Operations Manual Systems Setup. 2009, No date provided.
Noonan, J., "Intelligent Transportation Systems Field Operational Test Cross-Cutting Study Advanced Traveler Information Systems," Sep. 1998, 27 pages, U.S. Department of Transportation, McLean, VA, USA.
Odagaki et al., Automobile Navigation System with Multi-Source Guide Information, International Congress & Exposition, Feb. 24-28, 1992, pp. 97-105. SAE International, Warrendale, PA, USA.
Panasonic Portable Navigation System User Manual for Products KX-GT30, KX-GT30X, and KX-GT30Z, Cover page, pp. 1-5, 132-147, End pages, Matsushita Denki Sangyo K.K., Fukuoka City, Japan [Date Unknown].
Preliminary Invalidity Contentions of Defendant TomTom, Inc., Certificate of Service and Exhibit A filed May 16, 2011 in *Triangle Software, LLC.* V. *Garmin International, Inc. et al.*, Case No. 1: 10-cv-1457-CMH-TCB in the United States District Court for the Eastern District of Virginia, Alexandria Division, 354 pages.
Raper, J.F., "Three-Dimensional GIS," in Geographical Information Systems: Principles and Applications, 1991, vol. 1, Chapter 20, 21 pages.
"Reference Manual for the Magellan RoadMate 500/700." 2003, 65 pages, Thales Navigation, Inc., San Dimas, CA, USA.
Riiett, L.R., "Simulating the TravTek Route Guidance Logic Using the Integration Traffic Model," Vehicle Navigation & Information System, p. 253, Part 2, Oct. 1991, pp. 775-787, Soc. of Automotive Engineers, Inc., Warrendale, PA, USA.
Rillings, J.H., "Advanced Driver Information Systems," IEEE Transactions on Vehicular Technology, Feb. 1991, vol. 40, No. 1, pp. 31-40, IEEE, New York, NY, USA.
Rillings, J.H., "TravTek," Vehicle Navigation & Information System Conference Proceedings (VNIS'91), p. 253, Part 2, Oct. 1991, pp. 729-737, Soc. Of Automotive Engineers, Inc., Warrendale, PA, USA.
Rockwell, Mark, "Telematics Speed Zone Ahead," Wireless Week, Jun. 15, 2004, Reed Business Information, http://www.wirelessweek.com.
Rupert, R.L., "The TravTek Traffic Management Center and Traffic Information Network," Vehicle Navigation & Information System Conference Proceedings (VNIS'91), p. 253, Part 1, Oct. 1991, pp. 757-761, Soc. Of Automotive Engineers, Inc., Warrendale, PA, USA.
Schofer, J.L., "Behavioral Issues in the Design and Evaluation of Advanced Traveler Information Systems," Transportation Research Part C 1, 1993, pp. 107-117, Pergamon Press Ltd., Elsevier Science Ltd.
Schulz, W., "Traffic Management Improvement by Integrating Modem Communication Systems," IEEE Communications Magazine, Oct. 1996, pp. 56-60, New York, NY, USA.
Shepard, I.D.H., "Information Integration and GIS," in Geographical Information Systems: Principles and Applications, 1991, vol. 1, pp. Cover page, 337-360, end page.
Sirius Satellite Radio: Traffic Development Kit Start Up Guide, Sep. 27, 2005, Version 00.00.01, NY, New York, 14 pages.
Slothhower, D., "Sketches & Applications," SIGGRAPH 2001, pp. 138-144, Stanford University.
Sumner, R., "Data Fusion in Pathfinder and TravTek," Part 1, Vehicle Navigation & Information Systems Conference Proceedings (VNIS'91), Oct. 1991, Cover & Title page, pp. 71-75.
Supplemental Expert Report of William R. Michalson, PH.D. Regarding Invalidity of the Patents-in-Suit dated Jul. 5, 2011 in *Triangle Software, LLC* v. *Garmin International Inc. et al.*, in the United States District Court for the Eastern District of Virginia, Alexandria Division, Case No. 1:10-cv-1457-CMH-TCB, 23 pages.
Tamuara et al., "Toward Realization of VICS—Vehicle Information and Communications System," IEEE-IEE Vehicle Navigation & Information Systems Conference (VNIS'93), 1993, pp. 72-77, held in Ottawa, Canada.
Taylor, K.B., "TravTek-Information and Services Center," Vehicle Navigation & Information System Conference Proceedings (VNIS'91), p. 253, Part 2, Oct. 1991, pp. 763-774, Soc. Of Automotive Engineers, Inc., Warrendale, PA, USA.
Texas Transportation Institute, "2002 Urban Mobility Study: 220 Mobility Issues and Measures: The Effects of Incidents—Crashes and Vehicle Breakdowns" (2002).
"The Challenge of VICS: The Dialog Between the Car and Road has Begun," Oct. 1, 1996, pp. 19-63, The Road Traffic Information Communication System Centre (VICS Centre), Tokyo, Japan.
Thompson, S.M., "Exploiting Telecommunications to Delivery Real Time Transport Information," Road Transport Information and Control, Conf. Publication No. 454, Apr. 21-23, 1998, pp. 59-63, IEE, U.K.
Tonjes, R., "3D Reconstruction of Objects from Ariel Images Using a GIS," presented at ISPRS Workshops on "Theoretical and Practical Aspects of Surface Reconstructions and 3-D Object Extraction" Sep. 9-11, 1997, 8 pages, held in Haifa, Israel.
"Travtek Information and Services Center Policy/Procedures Manual," Feb. 1992, 133 pages, U.S. Department of Transportation, McLean, VA, USA.
Truett, R., "Car Navigation System May Live On After Test," The Orlando Sentinel, Feb. 17, 1993, p. 3 pages.
U.S. Dept. of Transportation, Closing the Data Gap: Guidelines for Quality Advanced Traveler Information System (ATIS) Data, Version 1.0, Sep. 2000, 41 pages.
User Guide of Tom Tom ONE; 2006.
Vollmer, R., "Navigation Systems—Intelligent Co-Drivers with Knowledge of Road and Tourist Information," Navigation and Intelligent Transportation Systems, Automotive Electronics Series, Society of Automotive Engineers, 1998, pp. Cover page, Table of Contents, pp. 9-17.
Volkswagen Group of America, Inc.'s Answer and Counterclaim, Feb. 24, 2011.
Watanabe, M. et al., "Development and Evaluation of a Car Navigation System Providing a Bird's-Eye View Map Display," Technical Paper No. 961007, Feb. 1, 1996, pp. 11-18, SAE International.
Wischhof, L. et al., "SOTIS—A Self-Organizing Traffic Information System," Proceedings of the 57th IEEE Vehicular Technology Conference (VTC—03), 2003, pp, 2442-2446, New York, NY, USA.
WSI, "TrueView Interactive Training Manual, Showfx Student Guide," Print Date: Sep. 2004, Document Version: 4.3x. Link: http://apollo.lsc.vsc.edu/intranet/WSI_Showfx/training/970-TVSK-SG-43.pdf.
XM Radio Introduces Satellite Update Service For Vehicle Navigation, Apr. 8, 2004, 2 pages.
Yim et al., TravInfo. Field Operational Test Evaluation "Evaluation of Travinfo Field Operation Test" Apr. 25, 2000.
Yim et al., "TravInfo Field Operational Test Evaluation: Information Service Providers Customer Survey", May 1, 2000.

(56) References Cited

OTHER PUBLICATIONS

Yokouchi, K., "Car-Navigation Systems," Mitsubishi Electr. Adv. Technical Reports, 2000, vol. 91, pp. 10-14, Japan.
You, J. et al., "Development and Evaluation of a Hybrid Travel Time Forecasting Model," Transportation Research Parc C 9, 2000, pp. 231-256, Pergamon Press Ltd., Elsevier Science Ltd., U.K.
Zhao, Y., "Vehicle Location and Navigation Systems," 1997, 370 pages, Arthech House, Inc., Norwood, MA, USA.
Zhu, C. et al. "3D Terrain Visualization for Web GIS," Center for Advance Media Technology, Nanyang Technological University, Singapore, 2003, 8 pages.
PCT Application No. PCT/US2004/23884, Search Report and Written Opinion mailed Jun. 17, 2005.
PCT Application No. PCT/US2011/48680, Search Report and Written Opinion mailed Feb. 7, 2012.
PCT Application No. PCT/US2011/51647, Search Report and Written Opinion mailed Feb. 2, 2012.
PCT Application No. PCT/US2011/60663, Search Report and Written Opinion mailed May 31, 2012.
PCT Application No. PCT/US2012/38702, Search Report and Written Opinion mailed Aug. 24, 2012.
PCT Application No. PCT/US2013/23505, Search Report and Written Opinion mailed May 10, 2013.
U.S. Appl. No. 12/398,120, Final Office Action mailed Mar. 26, 2013.
U.S. Appl. No. 12/398,120, Office Action mailed Nov. 14, 2012.
U.S. Appl. No. 12/398,120, Final Office Action mailed Apr. 12, 2012.
U.S. Appl. No. 12/398,120, Office Action mailed Nov. 15, 2011.
U.S. Appl. No. 12/860,700, Final Office Action mailed Jul. 22, 2014.
U.S. Appl. No. 12/860,700, Office Action mailed Apr. 3, 2014.
U.S. Appl. No. 12/860,700, Final Office Action mailed Jun. 26, 2013.
U.S. Appl. No. 12/860,700, Office Action mailed Feb. 26, 2013.
U.S. Appl. No. 12/881,690, Final Office Action mailed May 21, 2014.
U.S. Appl. No. 12/881,690, Office Action mailed Jan. 9, 2014.
U.S. Appl. No. 12/881,690, Final Office Action mailed Aug. 9, 2013.
U.S. Appl. No. 12/881,690, Office Action mailed Apr. 22, 2013.
U.S. Appl. No. 10/897,550, Office Action mailed Jun. 12, 2009.
U.S. Appl. No. 10/897,550, Office Action mailed Jan. 21, 2009.
U.S. Appl. No. 10/897,550, Office Action mailed Aug. 1, 2008.
U.S. Appl. No. 10/897,550, Office Action mailed Oct. 3, 2007.
U.S. Appl. No. 12/283,748, Office Action mailed Aug. 20, 2009.
U.S. Appl. No. 12/283,748, Office Action mailed Mar. 11, 2009.
U.S. Appl. No. 12/763,199, Final Office Action mailed Nov. 1, 2010.
U.S. Appl. No. 12/763,199, Office Action mailed Aug. 5, 2010.
U.S. Appl. No. 13/316,250, Final Office Action mailed Jun. 24, 2013.
U.S. Appl. No. 13/316,250, Office Action mailed Jan. 18, 2013.
U.S. Appl. No. 13/296,108, Final Office Action mailed Oct. 25, 2013.
U.S. Appl. No. 13/296,108, Office Action mailed May 9, 2013.
U.S. Appl. No. 10/379,967, Final Office Action mailed May 11, 2005.
U.S. Appl. No. 10/379,967, Office Action mailed Sep. 20, 2004.
U.S. Appl. No. 11/509,954, Office Action mailed Nov. 23, 2007.
U.S. Appl. No. 11/751,628, Office Action mailed Jan. 29, 2009.
U.S. Appl. No. 12/967,045, Final Office Action mailed Jun. 27, 2012.
U.S. Appl. No. 12/967,045, Office Action mailed Jul. 18, 2011.
U.S. Appl. No. 13/561,269, Office Action mailed Dec. 13, 2012.
U.S. Appl. No. 13/561,327, Office Action mailed Oct. 26, 2012.
U.S. Appl. No. 13/747,454, Office Action mailed Jun. 17, 2013.
U.S. Appl. No. 13/475,502, Final Office Action mailed Sep. 10, 2013.
U.S. Appl. No. 13/475,502, Office Action mailed Apr. 22, 2013.
U.S. Appl. No. 13/752,351, Office Action mailed Jul. 22, 2013.
Yang, Qi; "A Simulation Laboratory for Evaluation of Dynamic Traffic Management Systems", Massachusetts Institute of Technology, Jun. 1997.
U.S. Appl. No. 12/881,690, Office Action mailed Sep. 3, 2014.
U.S. Appl. No. 14/100,985, Office Action mailed Sep. 23, 2014.
U.S. Appl. No. 14/265,290, Andre Gueziec, Crowd Sourced Traffic Reporting, filed Apr. 29, 2014.
U.S. Appl. No. 14/327,468, Andre Gueziec, GPS Generated Traffic Information, filed Jul. 9, 2014.
U.S. Appl. No. 14/275,702, Andre Gueziec, System for Providing Traffic Data and Driving Efficiency Data, filed May 12, 2014.
Huang, Tsan-Huang, Chen, Wu-Cheng; "Experimental Analysis and Modeling of Route Choice with the Revealed and Stated Preference Data" Journal of the Eastern Asia Society for Transportation Studies, vol. 3, No. 6, Sep. 1999—Traffic Flow and Assignment.
U.S. Appl. No. 14/058,195, Office Action mailed Nov. 12, 2014.
U.S. Appl. No. 14/624,498, Andre Gueziec, Method for Choosing a Traffic Route, filed Feb. 17, 2015.
U.S. Appl. No. 14/637,357, Andre Gueziec, Touch Screen Based Interaction With Traffic Data, filed Mar. 3, 2015.
U.S. Appl. No. 14/265,290, Office Action mailed Jul. 23, 2015.
U.S. Appl. No. 14/327,468, Final Office Action mailed Aug. 4, 2015.
U.S. Appl. No. 14/058,195, Office Action mailed Aug. 4, 2015.
U.S. Appl. No. 14/846,576, Christopher Kantarjiev, System and Method for Delivering Departure Notifications, filed Sep. 4, 2015.
U.S. Appl. No. 14/793,879, Andre Gueziec, Generating Visual Information Associated With Traffic, filed Jul. 8, 2015.
U.S. Appl. No. 14/726,858, Andre Gueziec, Gesture Based Interaction With Traffic Data, filed Jun. 1, 2015.
US 9,019,260, 4/2015, Gueziec (withdrawn).
U.S. Appl. No. 14/100,985, Final Office Action mailed Mar. 25, 2015.
U.S. Appl. No. 14/327,468, Office Action mailed Mar. 12, 2015.
U.S. Appl. No. 14/058,195, Final Office Action mailed Apr. 8, 2015.
U.S. Appl. No. 14/692,097, Andre Gueziec, Method for Predicting a Travel Time for a Traffic Route, filed Apr. 21, 2015.
EP Patent Application No. 12785688.8 Extended European Search Report dated Aug. 12, 2015.
U.S. Appl. No. 14/100,985, Office Action mailed Oct. 1, 2015.
U.S. Appl. No. 14/275,702, Office Action mailed Nov. 30, 2015.

* cited by examiner

ESTIMATING TIME TRAVEL DISTRIBUTIONS ON SIGNALIZED ARTERIALS

CROSS-REFERENCE TO RELATED APPLICATION

The present application is a continuation and claims the priority benefit of U.S. patent application Ser. No. 13/752,351 filed Jan. 28, 2013, which will issue as U.S. Pat. No. 8,781,718 on Jul. 15, 2014, which claims the priority benefit of U.S. provisional application No. 61/591,758 filed on Jan. 27, 2012, the disclosures of which are incorporated herein by reference.

BACKGROUND

1. Field of the Invention

The present invention generally concerns traffic management. More specifically, the present invention concerns estimating time travel distributions on signalized arterials and thoroughfares.

2. Description of the Related Art

Systems for estimating traffic conditions have historically focused on highways. Highways carry a majority of all vehicle-miles traveled on roads and are instrumented with traffic detectors. Notably, highways lack traffic signals (i.e., they are not "signalized"). Estimating traffic conditions on signalized streets represents a far greater challenge for two main reasons. First, traffic flows are interrupted because vehicles must stop at signalized intersections. These interruptions generate complex traffic patterns. Second, instrumentation amongst signalized arterials is sparse because the low traffic volumes make such instrumentation difficult to justify economically.

In recent years, however, global positioning system (GPS) connected devices have become a viable alternative to traditional traffic detectors for collecting data. As a result of the permeation of GPS connected devices, travel information services now commonly offer information related to arterial conditions. Although such information is frequently available, the actual quality of the traffic estimations provided remains dubious.

Even the most cursory of comparisons between information from multiple service providers reveals glaring differences in approximated signalized arterial traffic conditions. The low quality of such estimations is usually a result of having been produced from a limited set of observations. Recent efforts, however, have sought to increase data collection by using re-identification technologies.

Such techniques have been based on be based on magnetic signatures, toll tags, license plates, or embedded devices. The sampling sizes obtained from such technologies are orders of magnitude greater than those obtained from mobile GPS units. Sensys Networks, Inc. of Berkeley, Calif., for example, collects arterial travel time data using magnetic re-identification and yields sampling rates of up to 50%. Notwithstanding these recently improved observation techniques, there remains a need to provide more accurate estimates of traffic conditions on signalized arterials.

SUMMARY OF THE PRESENTLY CLAIMED INVENTION

A system for estimating time travel distributions on signalized arterials includes a processor, memory, and an application stored in memory. The application is executable by the processor to receive data regarding travel times on a signalized arterial, estimate a present distribution of the travel times, estimate a prior distribution based on one or more travel time observations, and calibrate the present distribution based on the prior distribution.

DETAILED DESCRIPTION

Figure 1:
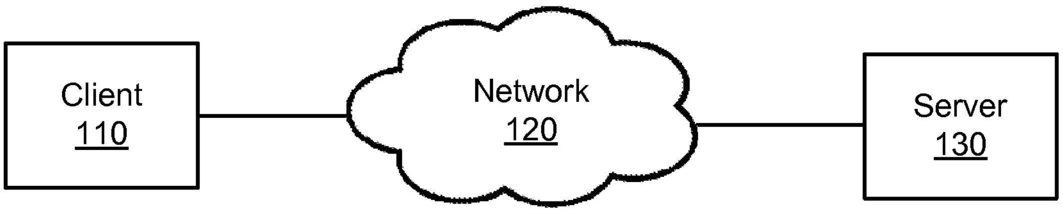
FIG. 1 is a block diagram of a system for estimating time travel distributions on signalized arterials.

FIG. 1 is a block diagram of a system for estimating time travel distributions on signalized arterials. The system of FIG. 1 includes a client computer 110, network 120, and a server 130. Client computer 110 and server 130 may communicate with one another over network 120. Client computer 110 may be implemented as a desktop, laptop, work station, notebook, tablet computer, smart phones, mobile device or other computing device. Network 120 may be implemented as one or more of a private network, public network, WAN, LAN, an intranet, the Internet, a cellular network or a combination of these networks.

Client computer 110 may implement all or a portion of the functionality described herein, including receive traffic data and other data or and information from devices using re-identification technologies. Such technologies may be based on magnetic signatures, toll tags, license plates, or embedded devices. Server 130 may receive probe data from GPS-connected mobile devices. Server 130 may communicate data directly with such data collection devices. Server 130 may also communicate, such as by sending and receiving data, with a third-party server, such as the one maintained by Sensys Networks, Inc. of Berkeley and accessible through the Internet at www.sensysresearch.com.

Server computer 130 may communicate with client computer 110 over network 120. Server computer may perform all or a portion of the functionality discussed herein, which may alternatively be distributed between client computer 110 and server 130, or may be provided by server 130 as a network service for client 110. Each of client 110 and server computer 130 are listed as a single block, but it is envisioned that either be implemented using one or more actual or logical machines.

In one embodiment, the system may utilize Bayesian Inference principles to update a prior belief based on new data. In such an embodiment, the system may determine the distribution of travel times y on a given signalized arterial at the present time T. The prior beliefs may include the shape of the travel time distribution and the range of its possible parameters $\theta_T$ (e.g., mean and standard deviation) that are typical of a given time of day, such that y follows a probability function $p(y|\theta_T)$. These parameters themselves may follow a probability distribution $p(\theta_T|\alpha_T)$ called the prior distribution. The prior distribution may comprise its own set of parameters $\alpha_T$, which are referred to as hyper-parameters.

The system may estimate the current parameters using a recent travel time observation of the arterial of interest. The system may also account for observations on neighboring streets. In still further embodiments, the system may consider contextual evidence such as local weather, incidents, and special events such as sporting events, one off road closures, or other intermittent traffic diversions. In one embodiment, y* may designate the current travel time observations. The system may determine the likeliest $\theta_T$ using a known y* and $\alpha_T$.

The system 100 may account for one or more travel time variability components. First, there may be individual variations between vehicles traveling at the same time of day. These variations stem from diverse driving profiles among drivers and their varying luck with traffic signals. Second, there may be recurring time-of-day variations that stem from fluctuating traffic demand patterns and signal timing. Third, there may be daily variations in the distributions of travel times over a given time slot. System 100 may account for other time travel variability components.

In one exemplary embodiment, the system 100 may employ standard Traffic Message Channel (TMC) location codes as base units of space, and fifteen-minute periods as base units of time. In such an embodiment, the system approximates that traffic conditions remain homogeneous across a given TMC location code over each fifteen-minute period. The system 100 may also use other spatial or temporal time units depending on the degree of precision desired. For example, the system 100 may normalize travel time data into a unit of pace that is expressed in seconds per mile. The system 100 may also calculate the average pace as a linear combination of individual paces weighted by distance traveled. Such calculations may be more convenient than using speed values.

Figure 2:
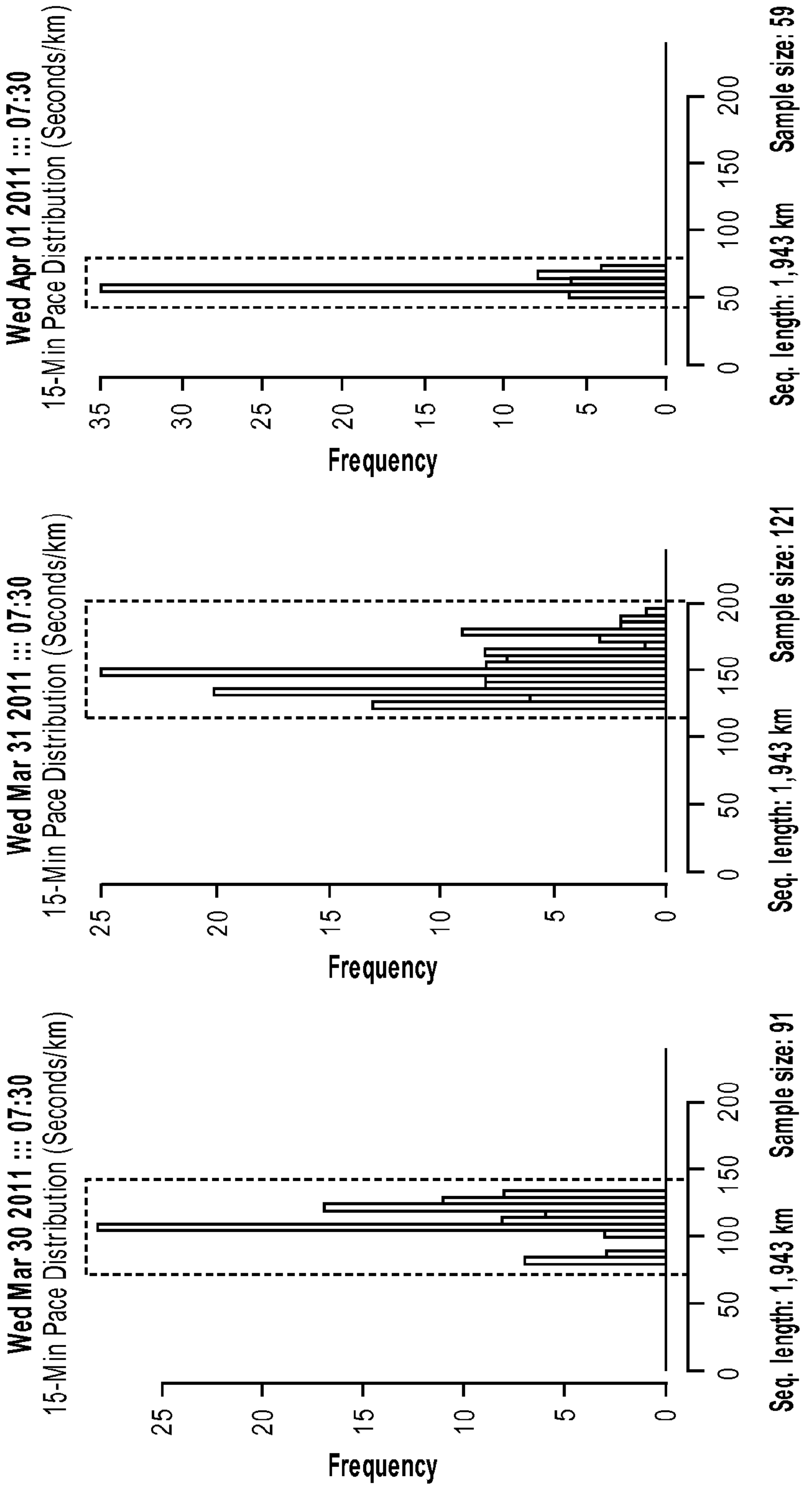
FIG. 2 is a series of graphs showing distributions of pace on a signalized arterial segment at the same time on over three consecutive days.

FIG. 2 is a series of graphs showing distributions of pace on a signalized arterial segment at the same time on over three consecutive days. More specifically, FIG. 2 shows an exemplary distribution of pace on a 2-km arterial segment in Seattle, Wash. for the same fifteen-minute time period on three consecutive days. As suggested in FIG. 2, determining an exact distribution shape for a given fifteen minute period on any given day may pose a difficult realistic objective. The presently described system can, however, directly observe three different states of an arterial segment and then calibrate the prior probabilities of being in either state from archived data. The system may also use real-time data to help refine a given brief regarding which of the multiple state applies to the real-time prediction.

Figure 3:
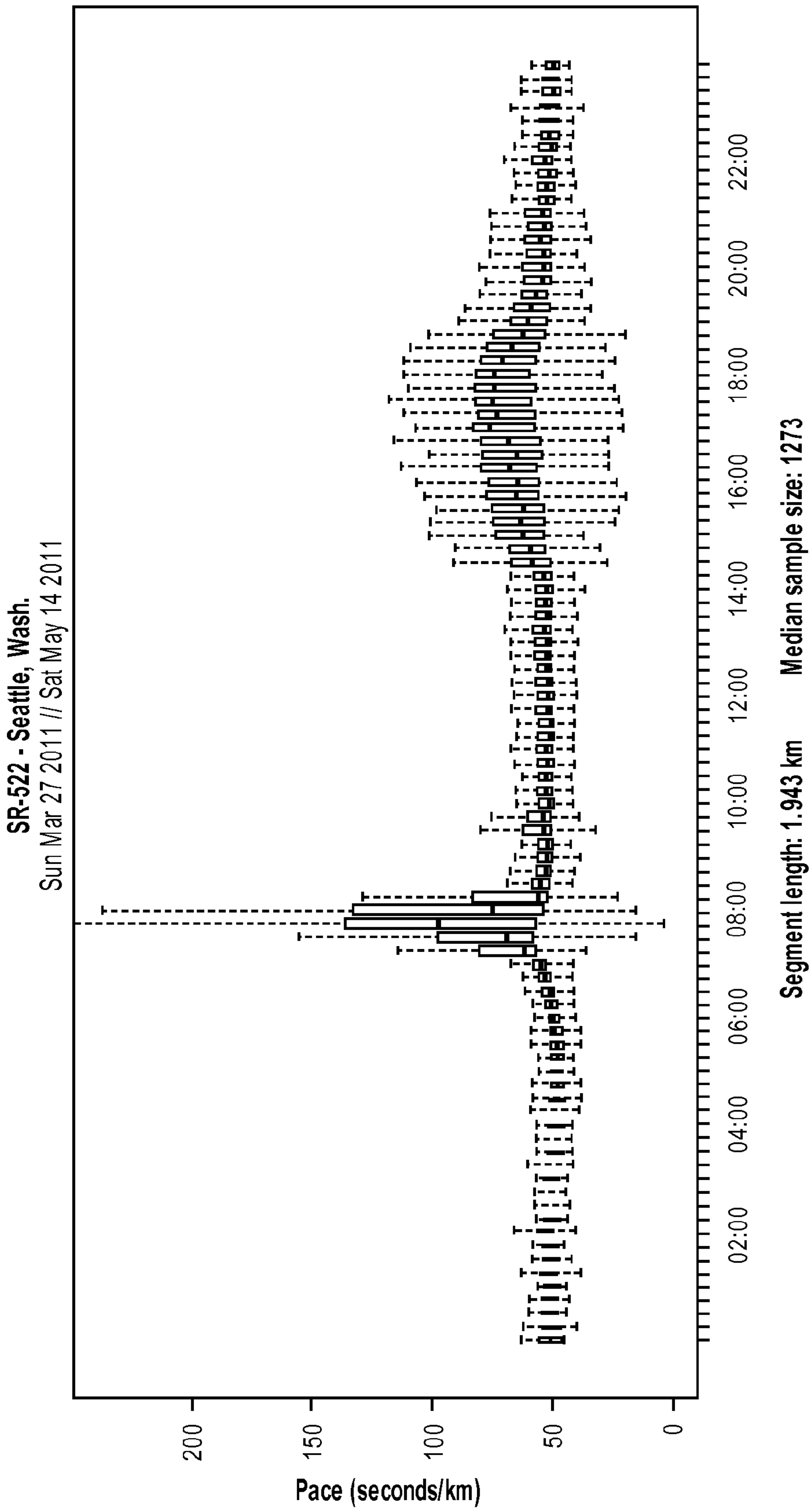
FIG. 3 is a graph showing variations in pace throughout different times periods in a day.

FIG. 3 is a graph showing variations in pace throughout different times periods in a day. As shown in FIG. 3, the presently disclosed system may account for time-of-day variations. Notably, the box indicates the 25th, 50th, and 75th percentile value while the dotted lines extend to extreme values. In such embodiments, the system may use data regarding regular patterns of increase and decrease in travel times to calibrate prior distributions by time of day.

Figure 4:
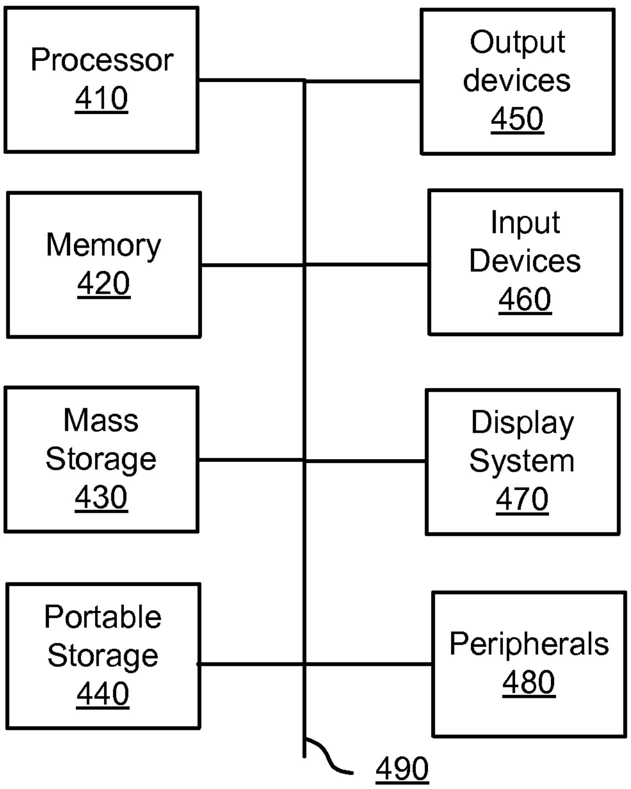
FIG. 4 is a block diagram of a device for implementing an embodiment of the presently disclosed invention.

FIG. 4 is a block diagram of a device 400 for implementing an embodiment of the presently disclosed invention. System 400 of FIG. 4 may be implemented in the contexts of the likes of client computer 110 and server computer 130. The computing system 400 of FIG. 4 includes one or more processors 410 and memory 420. Main memory 420 may store, in part, instructions and data for execution by processor 410. Main memory can store the executable code when in operation. The system 400 of FIG. 4 further includes a storage 420, which may include mass storage and portable storage, antenna 440, output devices 450, user input devices 460, a display system 470, and peripheral devices 480.

The components shown in FIG. 4 are depicted as being connected via a single bus 490. The components may, however, be connected through one or more means of data transport. For example, processor unit 410 and main memory 420 may be connected via a local microprocessor bus, and the storage 430, peripheral device(s) 480 and display system 470 may be connected via one or more input/output (I/O) buses. In this regard, the exemplary computing device of FIG. 4 should not be considered limiting as to implementation of the presently disclosed invention. Embodiments may utilize one or more of the components illustrated in FIG. 4 as might be necessary and otherwise understood to one of ordinary skill in the art.

Storage device 430, which may include mass storage implemented with a magnetic disk drive or an optical disk drive, may be a non-volatile storage device for storing data and instructions for use by processor unit 410. Storage device 430 can store the system software for implementing embodiments of the present invention for purposes of loading that software into main memory 410.

Portable storage device of storage 430 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device.

Antenna 440 may include one or more antennas for communicating wirelessly with another device. Antenna 440 may be used, for example, to communicate wirelessly via Wi-Fi, Bluetooth, with a cellular network, or with other wireless protocols and systems including but not limited to GPS, A-GPS, or other location based service technologies. The one or more antennas may be controlled by a processor 410, which may include a controller, to transmit and receive wireless signals. For example, processor 410 execute programs stored in memory 412 to control antenna 440 transmit a wireless signal to a cellular network and receive a wireless signal from a cellular network.

The system 400 as shown in FIG. 4 includes output devices 450 and input device 460. Examples of suitable output devices include speakers, printers, network interfaces, and monitors. Input devices 460 may include a touch screen, microphone, accelerometers, a camera, and other device. Input devices 460 may include an alpha-numeric keypad, such as a keyboard, for inputting alpha-numeric and other information, or a pointing device, such as a mouse, a trackball, stylus, or cursor direction keys.

Display system 470 may include a liquid crystal display (LCD), LED display, or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for estimating time travel distributions on signalized arterials, the method comprising:
- receiving travel data about a signalized arterial collected by one or more reidentification devices, the travel data corresponding to data collected within a common time segment in each of a plurality of different days;
- receiving real-time travel data about the signalized arterial collected by one or more reidentification devices; and
- executing instructions stored in memory, wherein execution of the instructions by a processor:
  - normalizes the travel data into a plurality of individual pace values, the pace values expressed as a ratio of time per distance,
  - calculates an average pace value for the signalized arterial as a linear combination of the individual pace values weighted by distance traveled across the signalized arterial,
  - estimates a distribution based on the average pace value, travel data, and store the estimated distribution in memory,
  - calibrates the distribution based on the real-time travel data, and
  - generates a real-time prediction of the traffic conditions of the signalized arterial based on the calibrated distribution.

2. The method of claim 1, wherein the travel data is received from one or more mobile GPS devices.

3. The method of claim 1, wherein the travel data is received from one or more reidentification devices.

4. The method of claim 3, wherein the reidentification device is a magnetic signature.

5. The method of claim 3, wherein the reidentification device is a toll tag.

6. The method of claim 3, wherein the reidentification device is a license plate.

7. The method of claim 3, wherein the reidentification device is a Bluetooth receiver.

8. The method of claim 1, wherein the travel data is received from a third-party server that collected the data.

9. The method of claim 1, wherein the server is an open-source server.

10. A non-transitory computer-readable storage medium, having embodied thereon a program executable by a processor to perform a method for estimating time travel distributions on signalized arterials, the method comprising:
- receiving travel data about a signalized arterial collected by one or more reidentification devices, the travel data corresponding to data collected within a common time segment in each of a plurality of different days;
- normalizing the travel data into a plurality of individual pace values, the pace values expressed as a ratio of time per distance;
- calculating an average pace value for the signalized arterial as a linear combination of the individual pace values weighted by distance traveled across the signalized arterial;
- estimating a distribution based on the average pace value, travel data, and store the estimated distribution in memory;
- receiving real-time travel data about the signalized arterial collected by one or more reidentification devices;
- calibrating the distribution based on the real-time travel data; and
- generating a real-time prediction of the traffic conditions of the signalized arterial based on the calibrated distribution.

11. The non-transitory computer-readable storage medium of claim 10, wherein the travel data is received from one or more mobile GPS devices.

12. The non-transitory computer-readable storage medium of claim 10, wherein the travel data is received from one or more reidentification devices.

13. The non-transitory computer-readable storage medium of claim 12, wherein the reidentification device is a magnetic signature.

14. The non-transitory computer-readable storage medium of claim 12, wherein the reidentification device is a toll tag.

15. The non-transitory computer-readable storage medium of claim 12, wherein the reidentification device is a license plate.

16. The non-transitory computer-readable storage medium of claim 12, wherein the reidentification device is a Bluetooth receiver.

17. The non-transitory computer-readable storage medium of claim 10, wherein the travel data is received from a third-party server that collected the data.

18. The non-transitory computer-readable storage medium of claim 10, wherein the server is an open-source server.

* * * * *